United States Patent
Kurosawa (10) Patent No.: US 11,155,122 B2
(45) Date of Patent: Oct. 26, 2021

(54) PNEUMATIC TIRE

(71) Applicant: Sumitomo Rubber Industries, Ltd., Kobe (JP)

(72) Inventor: Dai Kurosawa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 705 days.

(21) Appl. No.: 15/991,201

(22) Filed: May 29, 2018

(65) Prior Publication Data
US 2018/0361798 A1 Dec. 20, 2018

(30) Foreign Application Priority Data

Jun. 20, 2017 (JP) .............................. JP2017-120742
Apr. 3, 2018 (JP) .............................. JP2018-071783

(51) Int. Cl.
  *B60C 11/12* (2006.01)
  *B60C 11/03* (2006.01)
  *B60C 11/11* (2006.01)

(52) U.S. Cl.
  CPC ...... *B60C 11/1204* (2013.01); *B60C 11/0332* (2013.01); *B60C 11/11* (2013.01); *B60C 11/1236* (2013.01); *B60C 11/1263* (2013.01); *B60C 2011/0358* (2013.01); *B60C 2011/0381* (2013.01); *B60C 2011/1213* (2013.01); *B60C 2011/1227* (2013.01); *B60C 2011/1268* (2013.01); *B60C 2200/14* (2013.01)

(58) Field of Classification Search
  CPC . B60C 11/1263; B60C 11/0332; B60C 11/11; B60C 11/1204; B60C 11/1236; B60C 2011/1254; B60C 2011/0381; B60C 2011/1268; B60C 2011/1227
  USPC ................................................... 152/209.25
  See application file for complete search history.

(56) References Cited

U.S. PATENT DOCUMENTS 2,821,231 A * 1/1958 Kraft ................... B60C 11/0309
                                                152/209.22
6,003,575 A * 12/1999 Koyama ................. B60C 11/12
                                                152/209.18
(Continued)

FOREIGN PATENT DOCUMENTS

JP          2015-202776 A      11/2015

*Primary Examiner* — Katelyn W Smith
*Assistant Examiner* — Philip N Schwartz
(74) *Attorney, Agent, or Firm* — Birch, Stewart, Kolasch & Birch, LLP.

(57) ABSTRACT

A pneumatic tire includes a tread portion being provided with blocks which are provided with sipes. When the tread portion is virtually divided into a crown area having a ¼ tread ground-contact width centered on a tire equator, a pair of middle areas each having a ⅛ tread ground-contact width and being adjacent to axially each side of the crown area and a pair of inner shoulder areas each having a ⅛ tread ground-contact width and being adjacent to axially outside the middle areas, the sipes comprise crown sipes having main portions included in the crown area, middle sipes having main portions included in the middle areas and shoulder sipes having main portions included in the inner shoulder areas. Depths of the crown sipes are smaller than depths of the middle sipes, and depths of the shoulder sipes are smaller than the depths of the middle sipes.

17 Claims, 6 Drawing Sheets

(56) References Cited

U.S. PATENT DOCUMENTS

| | | | | |
|---|---|---|---|---|
| 6,050,313 A | * | 4/2000 | Tsuda | ............... B60C 11/12 152/209.18 |
| 2015/0290977 A1 | * | 10/2015 | Yamamoto | ............ B60C 11/11 152/209.18 |

* cited by examiner

FIG.6

PNEUMATIC TIRE

BACKGROUND ART

Field of the Disclosure

The present disclosure relates to pneumatic tires, and more particularly to a pneumatic tire having tread blocks with sipes.

Description of the Related Art

As pneumatic tires for four-wheel-drive vehicles, for example, block-patterned tires with a plurality of blocks in a tread portion are employed. Such tires are required to provide an excellent off-road performance to travel off-road such as rocky tracts and muddy grounds with sufficient traction and braking force.

To improve off-road performance, for example, it is known to produce pneumatic tires with sipes of the same depth formed in blocks to reduce rigidity of the blocks and facilitate deformation of the blocks, whereby the tires can grip more rocks and mud in grooves between blocks.

Unfortunately, such pneumatic tires may become deteriorated in steering stability on dry roads and likely to have blocks chipped due to reduction in rigidity of the blocks, which results in deterioration of durability performance.

SUMMARY OF THE INVENTION

The present disclosure is devised in light of the foregoing circumstances, and a major object of the present disclosure is to provide a pneumatic tire capable of improving steering stability on dry roads and durability while maintaining an excellent off-road performance.

According to one aspect of the disclosure, a pneumatic tire includes a tread portion being provided with blocks provided with sipes. When the tread portion is virtually divided into a crown area having a ¼ tread ground-contact width centered on a tire equator, a pair of middle areas each having a ⅛ tread ground-contact width and being adjacent to axially each side of the crown area and a pair of inner shoulder areas each having a ⅛ tread ground-contact width and being adjacent to axially outside the middle areas, the sipes comprise crown sipes having main portions included in the crown area, middle sipes having main portions included in the middle areas and shoulder sipes having main portions included in the inner shoulder areas. Depths of the crown sipes are smaller than depths of the middle sipes, and depths of the shoulder sipes are smaller than the depths of the middle sipes.

In another aspect of the disclosure, the blocks may include crown blocks arranged so as to straddle the crown area and one of the middle areas, and the crown sipes and the middle sipes are formed in the crown blocks.

In another aspect of the disclosure, the depths of the crown sipes and the depths of the shoulder sipes may be in a range of from 60% to 80% of radial heights of the blocks on which the crown sipes and/or the shoulder sipes are provided.

In another aspect of the disclosure, the depths of the middle sipes may be in a range of from 65% to 85% of radial heights of the blocks on which the middle sipes are provided.

In another aspect of the disclosure, as seen from a tire circumferential direction, the crown sipes and the middle sipes may be positioned so as not to overlap one another and the middle sipes and the shoulder sipes may be positioned so as not to overlap one another.

In another aspect of the disclosure, the crown sipes each may have a crown bend portion that bends at an angle of from 95 to 115 degrees in a tread plan view.

In another aspect of the disclosure, the crown bend portion may have a depth shallower than that of portions located on both sides thereof.

In another aspect of the disclosure, in each of the blocks on which the crown sipes are provided, the crown sipes each may have one end terminating within the block, and the difference in length between sipe perpendiculars extending from the one end to block edges on both sides of the sipe may be equal to or less than 10%.

In another aspect of the disclosure, the middle sipes each may have a middle bend portion that bends at an obtuse angle in a tread plan view, and the middle bend portion may have a depth shallower than that of portions located on both sides thereof.

In another aspect of the disclosure, in each of the sipes, both end portions of the sipe may have depths in a range of from 15% to 25% of a maximum depth of the sipe.

DESCRIPTION OF THE PREFERRED EMBODIMENTS

Figure 1:
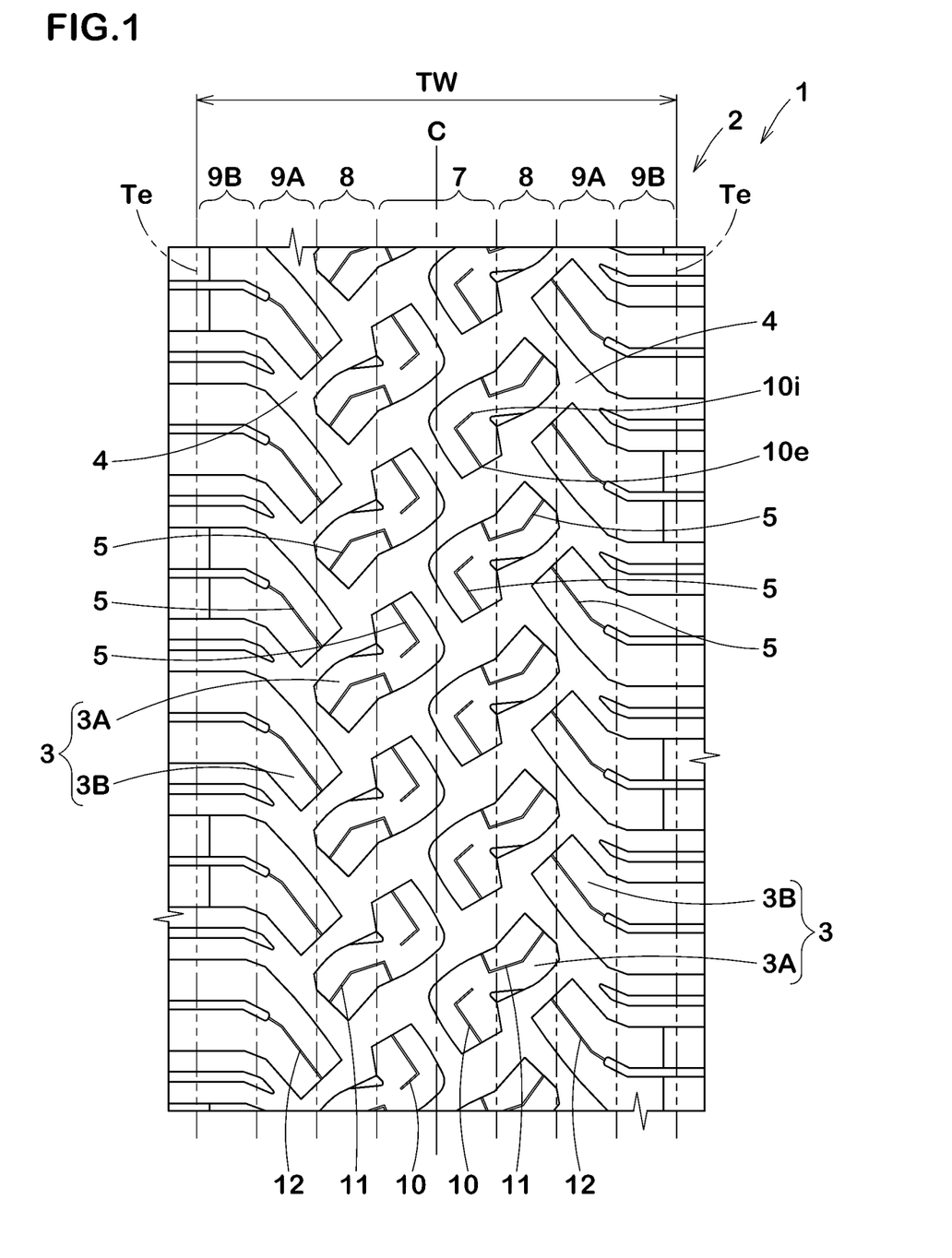
FIG. 1 is a developed view of a tread portion of a pneumatic tire according to an embodiment of the present disclosure.

An embodiment of the present disclosure will be described with reference to the drawings. FIG. 1 is a developed view of a tread portion 2 of a pneumatic tire (hereinafter, simply referred to as the "tire") 1 according to an embodiment of the present disclosure. In the embodiment, the tire 1 is illustrated as an all-season tire for four-wheel-drive vehicles as one preferred embodiment.

As illustrated in FIG. 1, the tire 1 in accordance with the embodiment has a blocked tread pattern in which a plurality of blocks 3 is provided on a tread portion 2. On the tread portion 2, grooves 4 are arranged to define the blocks 3.

The blocks 3 in accordance with the embodiment include crown blocks 3A and shoulder blocks 3B. In this embodiment, the crown blocks 3A are arranged on both sides of the tire equator C and are spaced in the tire circumferential direction. In the embodiment, the shoulder blocks 3B are arranged axially both sides the crown blocks 3A and are spaced in the tire circumferential direction.

In the embodiment, the crown blocks 3A and the shoulder blocks 3B are arranged in substantially point-symmetric manner with respect to an arbitrary point on the tire equator C except for a variable pitch. The block pattern of the tire 1 is not limited to the above aspect.

In the embodiment, the blocks 3 are provided with sipes 5. As used herein, a "sipe" shall mean a narrow cut or incision having a width equal to or less than 1.5 mm and is distinguished from a "groove" having a width wider than that of the sipe.

In the embodiment, the tread portion 2 is virtually divided into a crown area 7, a pair of middle areas 8, a pair of inner shoulder areas 9A and a pair of outer shoulder areas 9B.

The crown area 7 is an area having a ¼ tread-contact width TW centered on the tire equator C. Each of the middle areas 8 is an area having a ⅛ tread ground-contact width TW and is adjacent to the axially both sides of the crown area 7. Each of the inner shoulder areas 9A is an area having a ⅛ tread ground-contact width TW and is adjacent to the axially outside the middle areas 8. Each of the outer shoulder areas 9B is an area having a ⅛ tread ground-contact width TW and is formed between adjacent one of tread edges Te and one of the inner shoulder areas 9A.

As used herein, the "tread edges" Te refer to axially outermost edges of the ground contacting patch of the tread portion 2 which occurs under a normally inflated loaded condition when the camber angle of the tire is zero.

As used herein, the normally inflated loaded condition is such that the tire 1 is mounted on a standard wheel rim and inflated to a standard pressure and loaded with a standard tire load.

As used herein, a normal condition of the tire 1 is such that the tire 1 is mounted on the standard wheel rim and inflate to the standard pressure but loaded with no tire load. In the normal condition, the axial distance between the tread edges Te and Te is defined as the tread ground-contact width TW. In this application including specification and claims, various dimensions, positions and the like of the tire 1 refer to those under the normal condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

Figure 2:
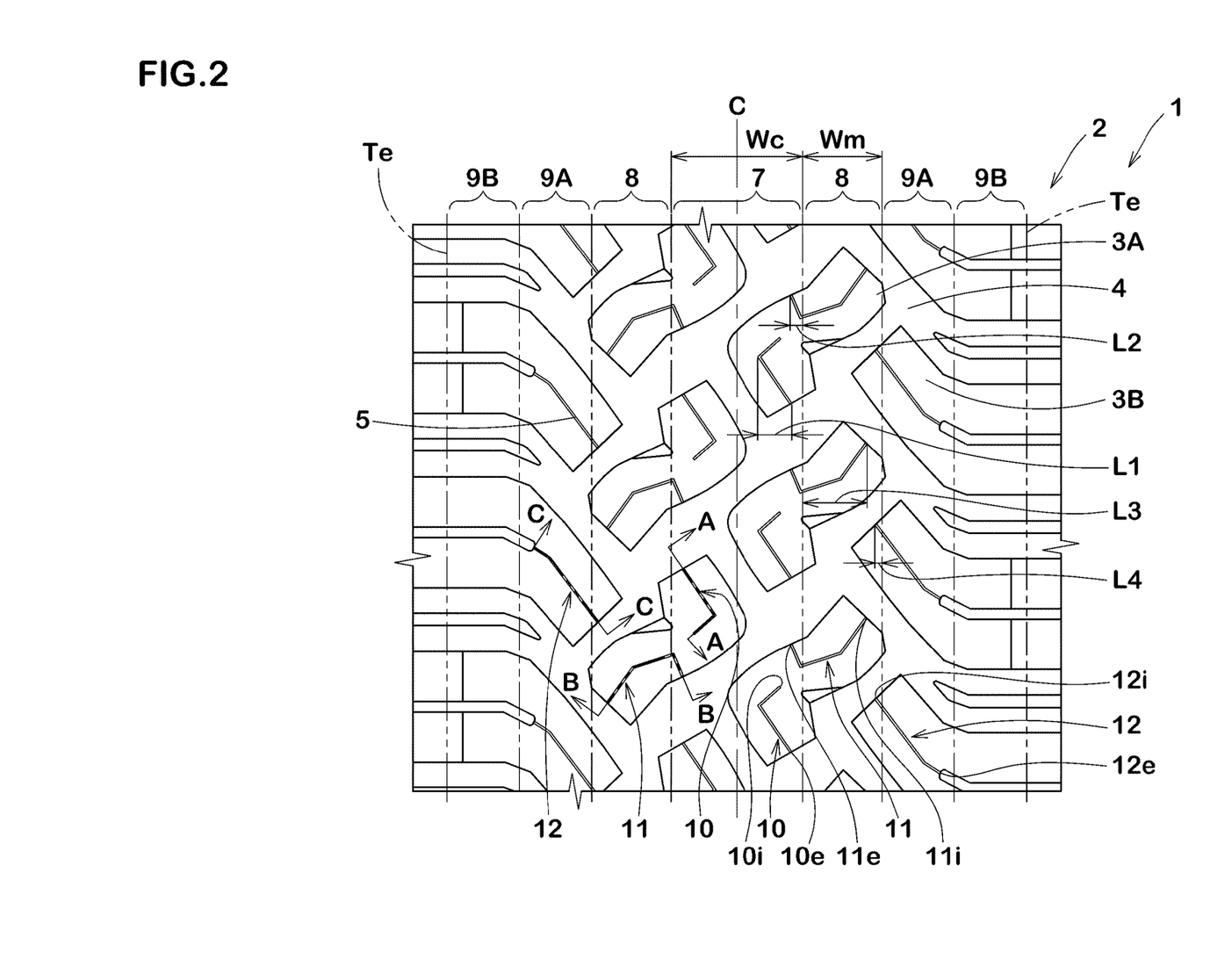
FIG. 2 is an enlarged view of FIG. 1.

FIG. 2 is an enlarged view of FIG. 1. As illustrated in FIG. 2, the sipes 5 include crown sipes 10, middle sipes 11, and shoulder sipes 12. The crown sipes 10 in the embodiment have main portions included in the crown area 7. The middle sipes 11 in the embodiment have main portions included in the middle areas 8. The shoulder sipes 12 in the embodiment have main portions included in the inner shoulder areas 9A. The sipes decrease rigidity of the blocks 3 in the areas 7, 8 and 9A such that each block 3 facilitates to deform. Therefore, the tire 1 can grip effectively rocks and mud in the grooves 4 between the blocks 3 and 3 to improve off-road performance. As used herein, each of the main portions as mentioned above refers to a portion having a length of equal to or more than 70% of the actual length of each sipe 5.

Figure 3A:
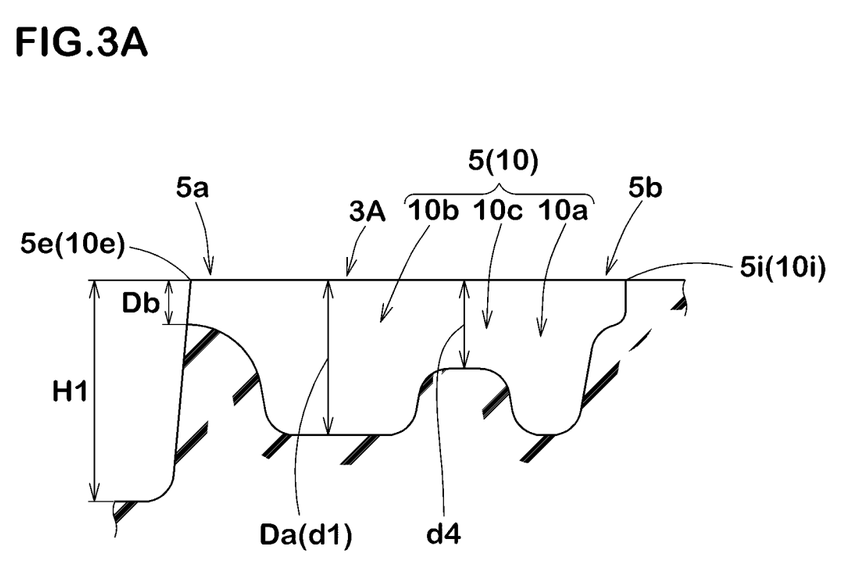
FIGS. 3A and 3B are cross-sectional views taken along line A-A and line B-B of FIG. 2, respectively.
Figure 3B:
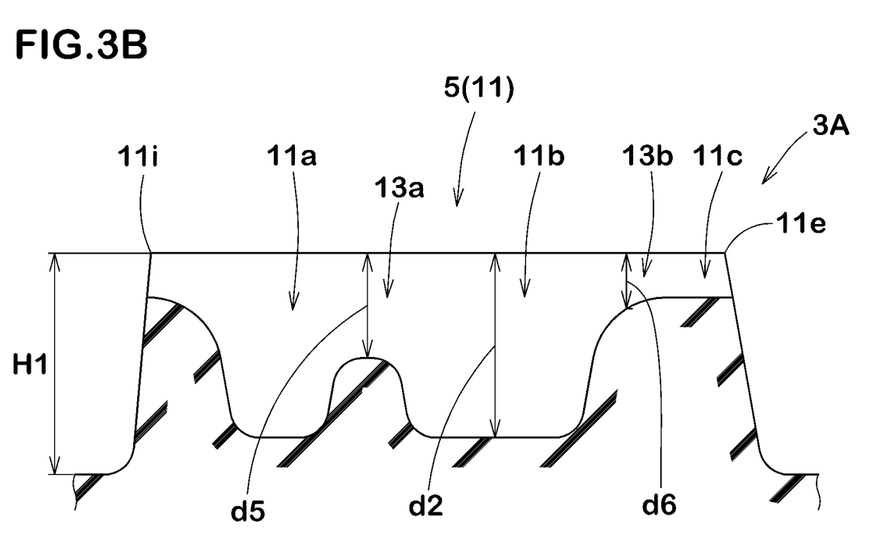

FIGS. 3A and 3B are cross-sectional views taken along line A-A and line B-B of FIG. 2, respectively. As illustrated in FIGS. 3A and 3B, depths d1 (the maximum depths) of the crown sipes 10 are smaller than depths d2 (the maximum depths) of the middle sipes 11. Accordingly, pattern rigidity of the crown area 7 is kept higher than pattern rigidity of the middle areas 8. This suppresses the occurrence of typical damage such as chipping on the crown area 7 which is supposed to receive a larger ground contact pressure than the middle areas 8, thereby achieving improvement in durability performance.

When the depths d1 of the crown sipes 10 are excessively smaller than the depths d2 of the middle sipes 11, deformation of the crown blocks 3A may be suppressed, and thus the tire 1 may not grip effectively rocks and mud in the grooves 4 between the blocks and may become deteriorated in off-road performance. Accordingly, the depths d1 of the crown sipes 10 are preferably equal to or more than 75% of the depths d2 of the middle sipes 11, but preferably equal to or less than 95% of the depths d2 of the middle sipes 11.

Figure 4:
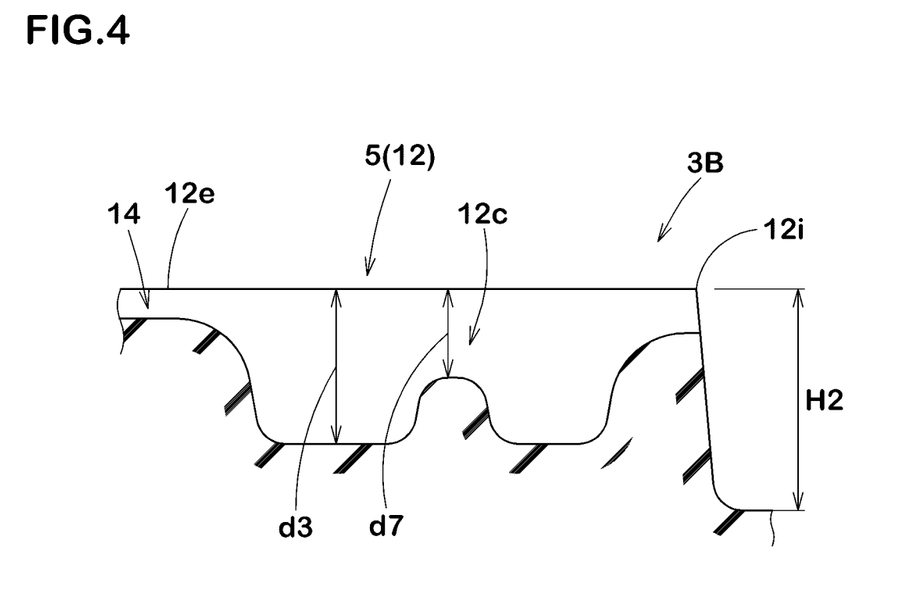
FIG. 4 is a cross-sectional view taken along line C-C of FIG. 2.

FIG. 4 is a cross-sectional view of one shoulder sipe 12 taken along line C-C of FIG. 2. As illustrated in FIG. 4, depths d3 (the maximum depths) of the shoulder sipes 12 are smaller than the depths d2 of the middle sipes 11. Accordingly, pattern rigidity of the inner shoulder areas 9A is kept higher than pattern rigidity of the middle areas 8. Since the inner shoulder areas 9A are areas which are supposed to receive a larger lateral force than the middle areas 8, the above-mentioned feature may achieve improvement in steering stability on dry roads.

When the depths d3 of the shoulder sipes 12 are excessively smaller than the depths d2 of the middle sipes 11, the tire 1 may not improve in off-road performance. Accordingly, the depths d3 of the shoulder sipes 12 are preferably equal to or more than 75% of the depths d2 of the middle sipes 11, but preferably equal to or less than 95% of the depths d2 of the middle sipes 11.

Although it is not particularly limited, but the depths d1 of the crown sipes 10 are preferably in a range of from 60% to 80% of heights H1 of the crown blocks 3A in the tire radial direction. Similarly, the depths d3 of the shoulder sipes 12 are preferably in a range of from 60% to 80% of height H2 of the shoulder blocks 3B in the tire radial direction. The depths d2 of the middle sipes 11 are preferably in a range of from 65% to 85% of the height H1 of the crown blocks 3A in the tire radial direction.

As illustrated in FIG. 2, the crown sipes 10, the middle sipes 11 and the shoulder sipes 12 are positioned so as not to overlap one another as seen from the tire circumferential direction. In other words, as seen from the tire circumferential direction, the crown sipes 10 and the middle sipes 11 are positioned so as not to overlap one another and the middle sipes 11 and the shoulder sipes 12 are positioned so as not to overlap one another. This feature suppresses substantial reduction in rigidity of the blocks 3 in the areas 7, 8, and 9. Therefore, it is possible to further enhance steering stability on dry roads and suppress damage such as chipping to further improve durability of the tire.

The crown blocks 3A in the embodiment are arranged over the crown area 7 and one of the middle areas 8. Specifically, each of the crown blocks 3A is arranged to straddle the crown area 7, one of the middle areas 8 and one of the inner shoulder areas 9A. In the embodiment, each the shoulder blocks 3B is arranged to straddle one of the middle areas 8, one of the inner shoulder areas 9A and one of the outer shoulder areas 9B. In the embodiment, the crown blocks 3A are not formed in the outer shoulder areas 9B. In the embodiment, the shoulder blocks 3B are not formed in the crown area 7.

Figure 5:
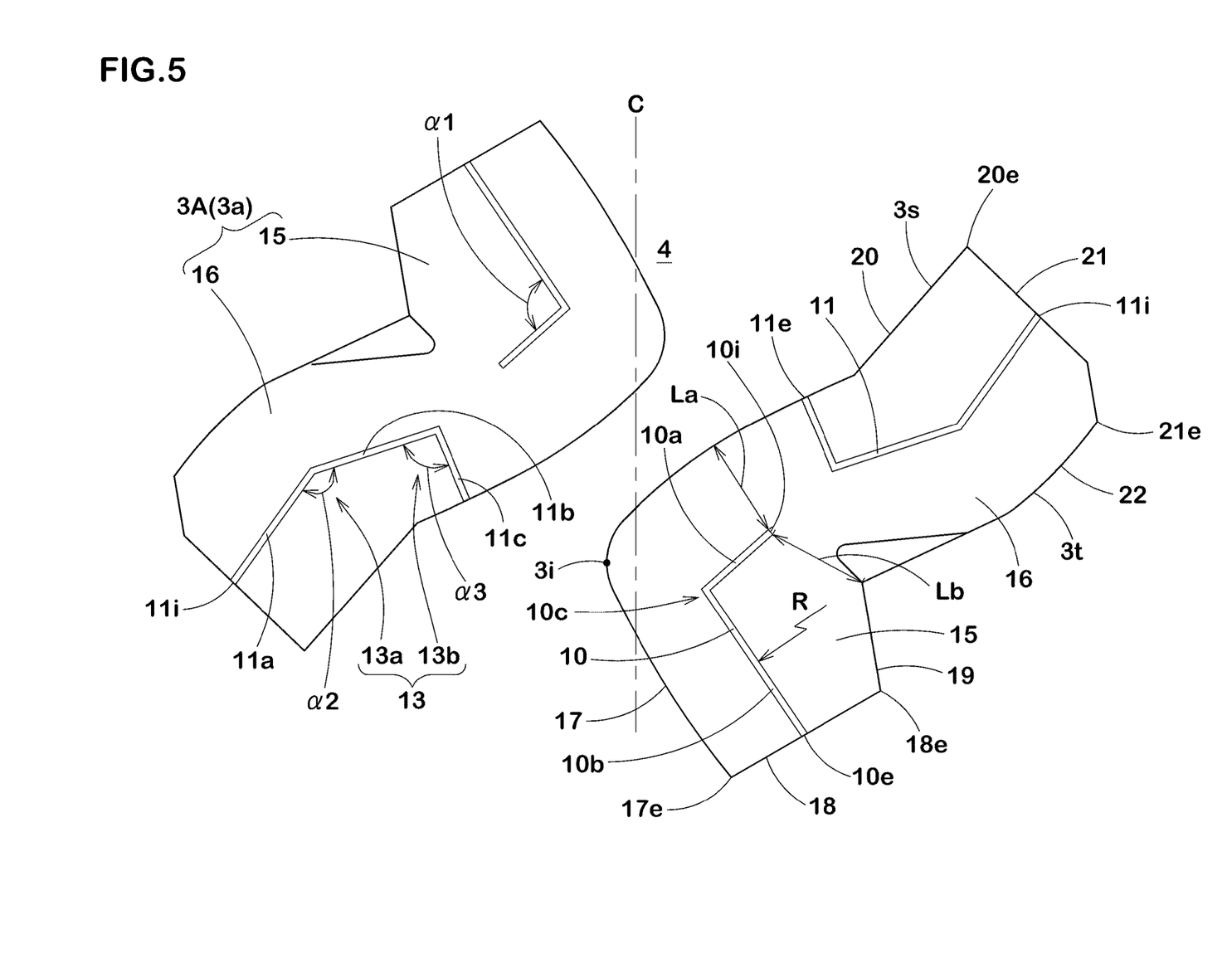
FIG. 5 is an enlarged view of crown blocks.

FIG. 5 illustrates an enlarged view of a pair of crown blocks 3A. As illustrated in FIG. 5, in the embodiment, each of the crown blocks 3A includes a first inclined portion 15 and a second inclined portion 16 to form an L-shaped ground contact surface 3a. The first inclined portion 15 is inclined from the tire equator C to one side in the tire circumferential direction. The second inclined portion 16 is inclined from the tire equator C in the opposite direction to the first inclined portion 15 at a larger angle than that of the first inclined portion 15 with respect to the tire circumferential direction.

In the embodiment, the first inclined portion 15 includes a first block edge 17, a second block edge 18 and a third block edge 19. The first block edge 17 extends from an axially inner end point 3i of the crown block 3A in the same inclination direction as the first inclined portion 15 with respect to the tire circumferential direction. The second block edge 18 extends from an axially outer end 17e of the first block edge 17 in the opposite direction to the first block edge 17 with respect to the tire circumferential direction. The third block edge 19 extends from an axially outer end 18e of the second block edge 18 in the same inclination direction as the first block edge 17 with respect to the tire circumferential direction. As used herein, each of the block edges refers to an outer peripheral edge where the ground contact surface of the block and a groove wall meet and does not include edges of the sipes and chamfered portions on the block.

In this embodiment, the second inclined portion 16 includes a fourth block edge 20, a fifth block edge 21 and a sixth block edge 22. The fourth block edge 20 extends from the inner end point 3i of the crown block 3A in the same inclination direction as the second inclined portion 16 with respect to the tire circumferential direction. The fifth block edge 21 extends from an axially outer end 20e of the fourth block edge 20 in the opposite direction to the fourth block edge 20 with respect to the tire circumferential direction. The sixth block edge 22 extends from an axially outer end 21e of the fifth block edge 21 in the same inclination direction as the fourth block edge 20 with respect to the tire circumferential direction.

Figure 6:
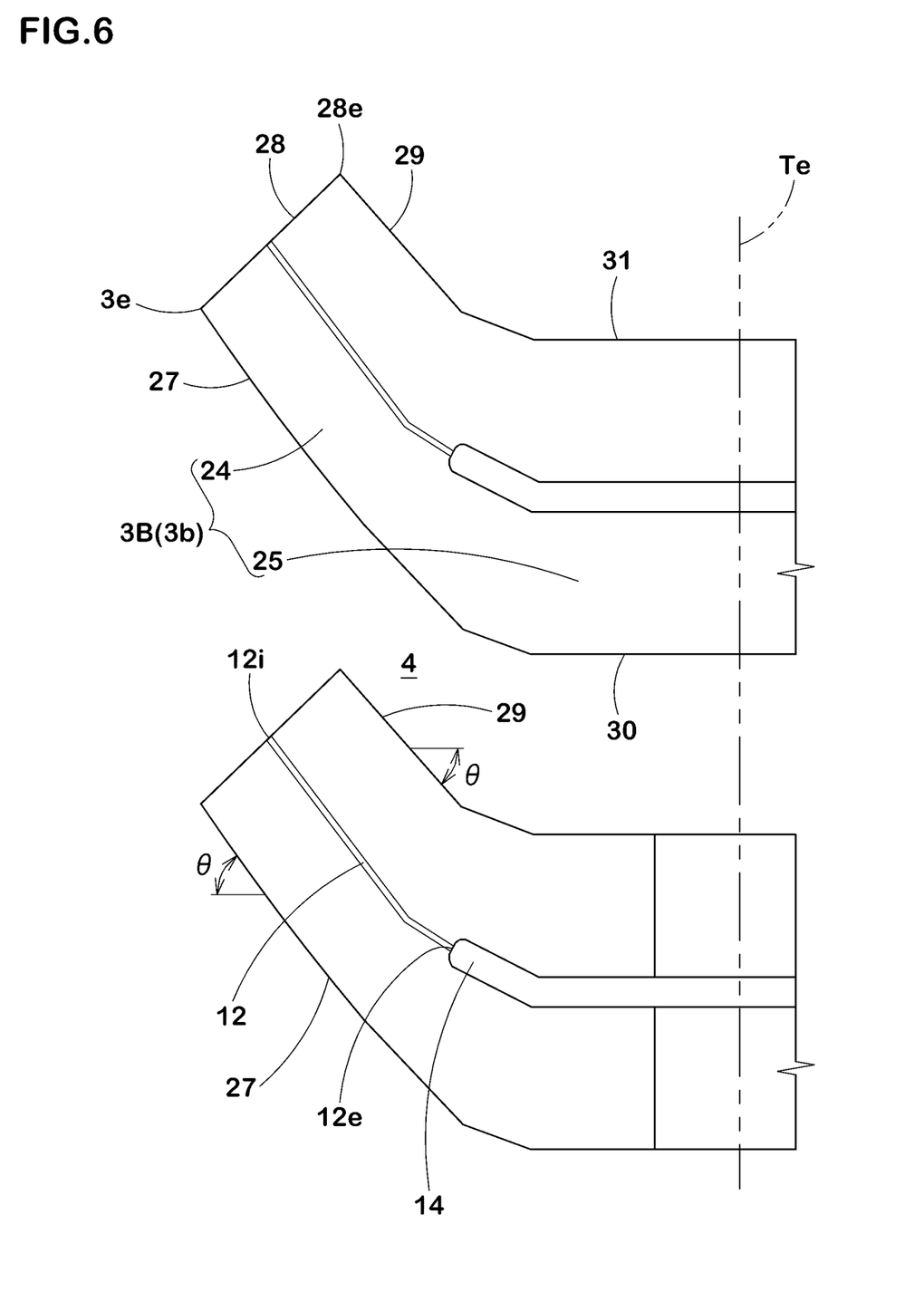
FIG. 6 is an enlarged view of shoulder blocks.

FIG. 6 is an enlarged view of two shoulder blocks 3B. As illustrated in FIG. 6, each of the shoulder blocks 3B includes an inclined portion 24 and an axial portion 25 to form a bent-shaped ground contact surface 3b. The inclined portion 24 extends outward from the tire equator C side in the tire axial direction in the same direction as the first inclined portion 15. The axial portion 25 connects to the inclined portion 24 and extends toward the outside of the tread edge Te in the tire axial direction.

In this embodiment, the inclined portion 24 includes a seventh block edge 27, an eighth block edge 28 and a ninth block edge 29. The seventh block edge 27 extends from an inner end point 3e of the shoulder block 3B nearest to the tire equator C side in the same inclination direction as the inclined portion 24 with respect to the tire circumferential direction. The eighth block edge 28 extends from the inner end point 3e in the opposite direction to the inclined portion 24 with respect to the tire circumferential direction. The ninth block edge 29 extends from an axially outer end 28e of the eighth block edge 28 to the tread edge Te side in the same inclination direction as the seventh block edge 27.

Angles θ of the seventh block edge 27 and the ninth block edge 29 of the inclined portion 24 is preferably of from 45 to 55 degrees with respect to the tire axial direction. When the angles θ are smaller than 45 degrees, lateral rigidity of the inclined portion 24 may become excessively high to interfere with deformation of the inclined portion 24, which may cause deterioration in off-road performance. When the angles θ are greater than 55 degrees, lateral rigidity of the inclined portion 24 may become excessively small, which may cause deterioration in steering stability on dry roads.

The axial portion 25 includes a tenth block edge 30 and an eleventh block edge 31. The tenth block edge 30 connects smoothly to the seventh block edge 27 and extends in the tire axial direction. The eleventh block edge 31 in this embodiment connects smoothly to the ninth block edge 29 and extends in the tire axial direction. The shoulder blocks 3B and the crown blocks 3A are not limited to the above aspect.

It is not particularly limited, but heights H1 and H2 of the crown blocks 3A and the shoulder blocks 3B, respectively, in the tire radial direction are preferably of from 12 to 18 mm.

As illustrated in FIG. 5, in this embodiment, the crown sipes 10 and the middle sipes 11 are provided in the crown blocks 3A. This reduces effectively rigidity of the crown blocks 3A so that the tire 1 can grip further effectively rocks and mud in the grooves 4 adjacent to the crown blocks 3A.

In this embodiment, the crown sipes 10 each are configured as a semi-open type in which one end 10i terminates within the respective crown blocks 3A and the other end 10e terminates at one of block edges, e.g. the second block edge 18 of the respective crown blocks 3A. These crown sipes 10 can suppress excessive reduction in rigidity of the crown area 7 on which a large ground-contact pressure acts.

In this embodiment, each of the crown sipes 10 has a crown bend portion 10c that bends at an angle α1 of from 95 to 115 degrees in a tread plan view. The crown bend portion 10c reduces locally rigidity of the crown block 3A to facilitate deformation of the crown block 3A. When the angle α1 is smaller than 95 degrees, rigidity of the crown bend portion 10c reduces excessively, which may not suppress the occurrence of chipping. When the angle α1 is greater than 115 degrees, deformation of the crown blocks 3A may not be facilitated.

The crown sipes 10 in the embodiment each include a first crown straight portion 10a connecting linearly the crown bend portion 10c and the one end 10i and a second crown straight portion 10b connecting linearly between the crown bend portion 10c and the other end 10e. These crown sipes 10 can suppress excessive reduction in rigidity of the crown blocks 3A. The straight portions (including middle straight portions described later) are not limited to a strictly straight shape but may be formed in the shape of an arc having a radius of curvature R of 80 mm or more.

In the embodiment, the first crown straight portion 10a extends along the fourth block edge 20. The second crown straight portion 10b extends along the first block edge 17. These crown sipes 10 can keep small rigidity difference in the first inclined portions 15 of the crown blocks 3A.

A difference (La−Lb) between lengths La and Lb of sipe perpendiculars extending from the one end 10i of the crown sipe 10 to block edges 3s and 3t on both sides of the crown sipe 10 is preferably equal to or less than 10% of the lengths La and Lb of the sipe perpendiculars. This makes it possible to keep high rigidity of the crown block 3A in the vicinity of the one end 10i of the crown sipe 10, thereby suppressing the occurrence of chipping originating from the one end 10i. The "block edges 3s and 3t on both sides" herein refer to the block edges on both sides in the tire axial direction. In this embodiment, the block edge 3s on the tire equator C side is formed from the first block edge 17 and the fourth block edge 20. In the embodiment, the block edge 3t on the tread edge Te side is formed from the third block edge 19 and the sixth block edge 22.

As illustrated in FIG. 3A, the crown bend portion 10c has a depth shallower than that of portions located on both sides thereof, i.e., the crown bend portion 10c is shallower than both first crown straight portion 10a and second crown straight portion 10b in this embodiment. This makes it possible to suppress reduction in rigidity of the vicinity of the crown bend portion 10c and reduce the occurrence of chipping and the like in a more effective manner. To enhance off-road performance and durability performance in a balanced manner, the depth d4 of the crown bend portion 10c is preferably in a range of from 30 to 50% of a height H1 of the crown block 3A in the tire radial direction.

In this embodiment, the first crown straight portion 10a and the second crown straight portion 10b are deepest in each of the crown sipes 10.

As illustrated in FIG. 5, the middle sipes 11 in this embodiment each are configured as a full-open type in which both ends 11e and 11i terminate at block edges such as the fourth block edge 20 and the fifth block edge 21 of the crown block 3A. These middle sipes 11 can reduce effectively rigidity of the crown blocks 3A in the middle areas 8 on which a lower ground-contact pressure than that on the crown area 7 and a smaller lateral force than that on the inner shoulder areas 9A act, resulting in further improving off-road performance.

In this embodiment, each of the middle sipes 11 has a middle bend portion 13 that bends at an obtuse angle in a tread plan view. The middle bend portion 13 includes a first middle bend portion 13a and a second middle bend portion 13b smaller in bend angle than the first middle bend portion 13a. These middle bend portions 13 reduce locally rigidity of the crown blocks 3A in the middle areas 8 to facilitate deformation of the crown blocks 3A.

The first middle bend portion 13a preferably has an angle α2 of from 130 to 160 degrees. The second middle bend portion 13b preferably has an angle α3 of more than 90 degrees and equal to or less than 120 degrees.

In this embodiment, each of the middle sipes 11 includes a first middle straight portion 11a, a second middle straight portion 11b and a third middle straight portion 11c. The first middle straight portion 11a connects linearly between the one end 11i and the first middle bend portion 13a. The second middle straight portion 11b connects linearly the first middle bend portion 13a and the second middle bend portion 13b. The third middle straight portion 11c in this embodiment connects linearly the second middle bend portion 13b and the other end 11e.

The first middle straight portion 11a and the second middle straight portion 11b extend along the sixth block edge 22, for example. In this embodiment, the third middle straight portion 11c extends along the fifth block edge 21. These middle sipes 11 suppress excessive reduction in rigidity of the crown blocks 3A in the middle areas 8.

As illustrated in FIG. 3B, the first middle bend portion 13a has a depth shallower than portions located on both sides thereof. In the embodiment, the first middle bend portion 13a is shallower than both first middle straight portion 11a and second middle straight portion 11b. This effectively reduces the occurrence of chipping originating from the first middle bend portion 13a.

A depth d5 of the first middle bend portion 13a is preferably larger than the depth d4 of the crown bend portion 10c. Accordingly, rigidity of the crown blocks 3A in the middle areas 8 under a smaller ground-contact pressure than that on the crown area 7 relatively decreases, resulting in improving off-road performance. To enhance off-road performance and durability of the tire in a well-balanced manner, the depth d5 of the first middle bend portion 13a is preferably in a range of from 40% to 60% of the height H1 of the crown block.

Since the second middle bend portion 13b is smaller in bend angle than the first middle bend portion 13a, the rigidity of the crown block 3A in the vicinity of the second middle bend portion 13b is smaller than the rigidity of the crown block 3A in the vicinity of the first middle bend portion 13a. This effectively suppresses the occurrence of chipping in the second middle bend portion 13b, depth d6 of the second middle bend portion 13b is preferably smaller than the depth d5 of the first middle bend portion 13a, for example. The depth d6 of the second middle bend portion 13b is preferably 50 to 80% of the depth d5 of the first middle bend portion 13a.

In this embodiment, the first middle straight portion 11a and the second middle straight portion 11b are deepest in the middle sipe 11. In this embodiment, the third middle straight portion 11c is shallowest in the middle sipe 11.

As illustrated in FIG. 6, in this embodiment, the shoulder sipes 12 are provided in the shoulder blocks 3B. This reduces rigidity of the shoulder blocks 3B, whereby the tire 1 can effectively grip rocks and mud in the grooves 4 sandwiched between the shoulder blocks 3B.

The shoulder sipes 12 extend to one side in the tire circumferential direction in a tread plan view. In the embodiment, the shoulder sipes 12 are inclined in the same direction as that of the inclined portions 24 of the shoulder blocks 3B. These shoulder sipes 12 suppress excessive reduction in rigidity of the shoulder blocks 3B on which large lateral force acts.

As illustrated in FIG. 4, each of the shoulder sipes 12 has a longitudinally central portion 12c having a depth shallower than portions located on both sides thereof. This suppresses excessive reduction in rigidity of the shoulder blocks 3B. The depth d7 of the central portion 12c of the shoulder sipe 12 is preferably in a range of from 50% to 70% of the maximum depth d3 of the shoulder sipe 12.

As illustrated in FIG. 6, in the embodiment, each of the shoulder sipes 12 has an axially outer end 12e in communicating with a shoulder lateral groove 14 extending outward over the tread edge Te in the tire axial direction. The shoulder lateral groove 14 extends along the inclined portion 24 and the axial portion 25. These shoulder lateral grooves 14 can facilitate deformation of the shoulder blocks 3B while suppressing excessive reduction in rigidity of the shoulder blocks 3B.

As illustrated in FIGS. 3A, 3B and 5, both longitudinal end portions 5a and 5b of the sipes 5 preferably have depths Db of from 15% to 25% of the respective maximum depths Da of the sipes 5. When the depths Db of the both end portions 5a and 5b are smaller than 15% of the maximum depths Da, the tire 1 may become deteriorated in off-road performance. When the depths Db of the both end portions 5a and 5b are greater than 25% of the maximum depths Da, the blocks 3 may reduce in rigidity to deteriorate durability performance and steering stability on dry roads. The both end portions 5a and 5b are at a distance of 5 mm from the one end 5i and the other end 5e of the sipes 5.

As illustrated in FIG. 2, the crown area 7 in this embodiment includes the crown sipes 10 and the middle sipes 11. In this embodiment, the whole crown sipes 10 are included in the crown area 7. On the other hand, as to the middle sipes 11, only the end portions having the other ends 11e are included in the crown area 7. Preferably, the sum of an axial length L1 of one crown sipe 10 provided in the crown area 7 and an axial length L2 of one end portion of one middle sipe 11 (L1×2+L2×2) is preferably equal to or more than 60% of the tire axial width Wc of the crown area 7. When the sum of the lengths of the crown sipe 10 and the middle sipe 11 (L1×2+L2×2) is less than 60% of the width Wc of the crown area 7, it may be difficult to reduce rigidity of the crown blocks 3A in the crown area 7 effectively, thus decreasing the force of gripping mud and rocks in the grooves 4. When the sum of the lengths of the crown sipe 10 and the middle sipe 11 (L1×2+L2×2) is excessively large, rigidity of the crown blocks 3A in the crown area 7 on which large ground-contact pressure acts may greatly decrease to deteriorate steering stability on dry roads and durability performance. In view of this, a crown area sipe ratio of the sum of the lengths (L1×2+L2×2) of one crown sipe 10 and one middle sipe 11 to the width Wc of the crown area 7 is preferably equal to or less than 80%.

The middle areas 8 in this embodiment include the middle sipes 11 and the shoulder sipes 12. In this embodiment, the main portions of the middle sipes 11 are included in the middle areas 8. In this embodiment, as to the shoulder sipes 12, only the end portions having the ends 12i are included in the middle areas 8. Preferably, a middle area sipe ratio of the sum of axial lengths (L3+L4) of the sipes provided on one crown block 3A and one shoulder block 3B included in each middle area 8 is more than the crown area sipe ratio, for example. Accordingly, rigidity of the middle areas 8 may become relatively smaller than rigidity of the crown area 7, resulting in improving off-road performance, durability and steering stability on dry roads in a well-balanced manner. From the foregoing viewpoint, the middle area sipe ratio is preferably in a range of from 75% to 95%.

No sipes are provided on a portion of the crown blocks 3A which is included in the inner shoulder areas 9A. This suppresses excessive reduction in rigidity of the crown blocks 3A to maintain high durability and steering stability on dry roads.

While the particularly preferable embodiments in accordance with the present invention have been described in detail, the present invention is not limited to the illustrated embodiments but can be modified and carried out in various aspects.

EXAMPLE

Test tires for four-wheel-drive vehicles of size 285/70R17 with a basic pattern illustrated in FIG. 1 were produced in accordance with the specifications shown in Table 1, and the test tires were tested for off-road performance, steering stability on dry roads, and durability performance. Main common specifications of the tires and test method are as follows:
Heights H1 of crown blocks: 15.0 mm
Heights H2 of shoulder blocks: 15.0 mm
d4/H1: 40%
d5/H1: 45%
Angle θ: 50 degrees Test for Off-Road Performance and Steering Stability on Dry Roads:

The test tires were mounted to all wheels of a four-wheel-drive vehicle with a displacement of 3600 cc. Then, a test driver drove the vehicle in an off-road test course including a soft muddy surface and a rocky surface and a test course including a dry asphalt surface. The test driver then made sensory evaluations on the test tires for driving characteristics related to traction, grip on mud and rocks, and steering stability. The test results are represented by scores with a score of 100 representing the values of the comparative reference tire (Ref. 1) such that the results are better with greater values.
Rim size: 17×7.5J
Internal pressure: 255 kPa
Tire load: 54% of standard tire load Test for Durability (The Occurrence of Chipping):

After the testing for off-road performance and steering stability on dry roads, the tires were visually checked by a tester for chipping in the crown blocks and shoulder blocks. The test results are represented by scores with a score of 100 representing the values of the Ref. 1 based on the number and condition of chipped portions. The tires were less chipped and more excellent in durability performance with greater values. Table 1 shows the test results and others.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| d1/H1 (%) | 87 | 70 | 60 | 80 | 65 | 70 | 70 | 75 | 70 | 70 |
| d2/H1 (%) | 87 | 75 | 75 | 85 | 70 | 85 | 75 | 80 | 75 | 75 |
| d3/H2 (%) | 87 | 70 | 70 | 65 | 65 | 70 | 65 | 75 | 70 | 70 |
| Angle α1 (deg.) | 180 | 105 | 105 | 105 | 105 | 105 | 105 | 105 | 95 | 115 |
| Steering stability on dry roads | 100 | 120 | 122 | 110 | 120 | 110 | 122 | 110 | 115 | 115 |
| Off-roading performance | 100 | 100 | 90 | 105 | 95 | 105 | 90 | 105 | 100 | 100 |
| Durability performance | 100 | 120 | 122 | 110 | 120 | 110 | 122 | 110 | 115 | 115 |

The test results have revealed that the tires of examples were improved in durability and steering stability on dry roads while maintaining off-road performance as compared to the comparative example tire.

What is claimed is:
1. A pneumatic tire comprising:
a tread portion being provided with blocks provided with sipes; wherein
when the tread portion is virtually divided into a crown area having a ¼ tread ground-contact width centered on a tire equator, a pair of middle areas each having a ⅛ tread ground- contact width and being adjacent to axially each side of the crown area and a pair of inner shoulder areas each having a ⅛ tread ground-contact width and being adjacent to axially outside the middle areas, the sipes comprise crown sipes having main portions included in the crown area, middle sipes having main portions included in the middle areas and shoulder sipes having main portions included in the inner shoulder areas,
depths of the crown sipes are smaller than depths of the middle sipes,
depths of the shoulder sipes are smaller than the depths of the middle sipes, and the crown sipes each have a crown bend portion that bends at an angle of from 95 to 115 degrees in a tread plan view.

2. The pneumatic tire according to claim 1, wherein the blocks comprise crown blocks arranged so as to straddle the crown area and one of the middle areas, and the crown sipes and the middle sipes are formed in the crown blocks.

3. The pneumatic tire according to claim 1, wherein the depths of the crown sipes and the depths of the shoulder sipes are in a range of from 60% to 80% of radial heights of the blocks on which the crown sipes and the shoulder sipes are provided.

4. The pneumatic tire according to claim 1, wherein the depths of the middle sipes are in a range of from 65% to 85% of radial heights of the blocks on which the middle sipes are provided.

5. The pneumatic tire according to claim 1, wherein as seen from a tire circumferential direction, the crown sipes and the middle sipes are positioned so as not to overlap one another and the middle sipes and the shoulder sipes are positioned so as not to overlap one another.

6. The pneumatic tire according to claim 1, wherein the crown bend portion has a depth shallower than that of portions located on both sides thereof.

7. The pneumatic tire according to claim 1, wherein in each of the blocks on which the crown sipes are provided, the crown sipes each have one end terminating within the block, and the difference in length between sipe perpendiculars extending from the one end to block edges on both sides of the sipe is equal to or less than 10%.

8. The pneumatic tire according to claim 1, wherein the middle sipes each have a middle bend portion that bends at an obtuse angle in a tread plan view, and the middle bend portion has a depth shallower than that of portions located on both sides thereof.

9. The pneumatic tire according to claim 1, wherein in each of the sipes, both end portions of the sipe have depths in a range of from 15% to 25% of a maximum depth of the sipe.

10. The pneumatic tire according to claim 2, wherein the depths of the crown sipes and the depths of the shoulder sipes are in a range of from 60% to 80% of radial heights of the blocks on which the crown sipes and the shoulder sipes are provided.

11. The pneumatic tire according to claim 2, wherein the depths of the middle sipes are in a range of from 65% to 85% of radial heights of the blocks on which the middle sipes are provided.

12. The pneumatic tire according to claim 3, wherein the depths of the middle sipes are in a range of from 65% to 85% of radial heights of the blocks on which the middle sipes are provided.

13. The pneumatic tire according to claim 2, wherein as seen from a tire circumferential direction, the crown sipes and the middle sipes are positioned so as not to overlap one another and the middle sipes and the shoulder sipes are positioned so as not to overlap one another.

14. The pneumatic tire according to claim 3, wherein as seen from a tire circumferential direction, the crown sipes and the middle sipes are positioned so as not to overlap one another and the middle sipes and the shoulder sipes are positioned so as not to overlap one another.

15. The pneumatic tire according to claim 4, wherein as seen from a tire circumferential direction, the crown sipes and the middle sipes are positioned so as not to overlap one another and the middle sipes and the shoulder sipes are positioned so as not to overlap one another.

16. A pneumatic tire comprising:
a tread portion being provided with blocks provided with sipes; wherein
when the tread portion is virtually divided into a crown area having a ¼ tread ground-contact width centered on a tire equator, a pair of middle areas each having a ⅛ tread ground- contact width and being adjacent to axially each side of the crown area and a pair of inner shoulder areas each having a ⅛ tread ground-contact width and being adjacent to axially outside the middle areas, the sipes comprise crown sipes having main portions included in the crown area, middle sipes having main portions included in the middle areas and shoulder sipes having main portions included in the inner shoulder areas,
depths of the crown sipes are smaller than depths of the middle sipes,
depths of the shoulder sipes are smaller than the depths of the middle sipes, and
in each of the blocks on which the crown sipes are provided, the crown sipes each have one end terminating within the block, and the difference in length between sipe perpendiculars extending from the one end to block edges on both sides of the sipe is equal to or less than 10%.

17. A pneumatic tire comprising:
a tread portion being provided with blocks provided with sipes; wherein
when the tread portion is virtually divided into a crown area having a ¼ tread ground-contact width centered on a tire equator, a pair of middle areas each having a ⅛ tread ground-contact width and being adjacent to axially each side of the crown area and a pair of inner shoulder areas each having a ⅛ tread ground-contact width and being adjacent to axially outside the middle areas, the sipes comprise crown sipes having main portions included in the crown area, middle sipes having main portions included in the middle areas and shoulder sipes having main portions included in the inner shoulder areas,
a maximum depth of the crown sipes is smaller than a maximum depth of the middle sipes,
a maximum depth of the shoulder sipes is smaller than the maximum depth of the middle sipes, and
the maximum depth of the crown sipes and the maximum depth of the shoulder sipes are in a range of from 60% to 80% of radial heights of the blocks on which the crown sipes and the shoulder sipes are provided.

* * * * *